United States Patent Office 3,657,165
Patented Apr. 18, 1972

3,657,165
PROCESS FOR PREPARATION OF ETHYLENIC RESIN FOAM
Isamu Kawai, Ageo-shi, Atsuro Nishikawa, Osaka-fu, Osamu Takagi, Kuki-machi, Minami-Saitama-gun, and Akira Iwata and Kohei Sugiyama, Osaka-fu, Japan, assignors to Sekisui Kagaku Kogyo Kabushiki Kaisha, Osaka, Japan
No Drawing. Filed Oct. 7, 1969, Ser. No. 864,549
Claims priority, application Japan, Oct. 11, 1968, 43/74,489; July 1, 1969, 44/52,314
Int. Cl. C08f 47/10, 29/04
U.S. Cl. 260—2.5 E                                5 Claims

ABSTRACT OF THE DISCLOSURE

A process of producing an ethylenic resin foam by mixing and kneading an ethylenic resin with a volatile organic foaming agent under heating and pressure to form a flowable gel and releasing the pressure by extruding out the gel, characterized by the use as said foaming agent of a mixture comprising (A) dichlorodifluoromethane and (B) at least one compound selected from the group consisting of aliphatic hydrocarbons having a boiling point of about 0–70° C. and chlorofluorohydrocarbons having a boiling point of about 0–70° C., said foaming agent having a saturated vapour pressure of less than 25 kg./cm.$^2$ at 100° C.

The present invention relates to a process for the preparation of an ethylenic resin foam. In particular, the invention relates to a process for the preparation of a satisfactory ethylenic resin foam by extrusion foaming of ethylenic resins using as the foaming agent a mixture of dichlorodifluoromethane and a specific volatile organic compound.

It has hitherto been well known to prepare an ethylenic resin foam by mixing and kneading an ethylenic resin with a foaming agent consisting of a volatile organic compound under heating and pressure to foam a flowable gel and releasing the pressure by extruding out the gel.

In the above process, it is necessary that the volatile organic compound used as the foaming agent should have a poor solvent capacity for ethylenic resins. For, if a volatile organic compound with a good solvent capacity is used, the separation of the foaming agent consisting of this volatile organic compound from the ethylenic resin is difficult and sufficient foaming can not be effected, since the affinity of the compound with the ethylenic resin is high even at the temperatures and pressures at which the compound is fully capable of being vapourized.

Dichlorodifluoromethane meets the requirements for foaming agents for ethylenic resins, and dichlorodifluoromethane is easy to handle since it has a moderate boiling point, low toxicity and has no inflammability, and in addition, it is comparatively inexpensive, and therefore it is a desirable foaming agent for ethylenic resins.

Although dichlorodifluoromethane has desirable properties as a foaming agent for ethylenic resins as described above, it has the following two main defects.

Namely, one defect is that notwithstanding that it is necessary to heat ethylenic resins at a temperature of at least 90° C. and preferably above 100° C. to impart to them a sufficient fluidity for foaming them, the boiling point of dichlorodifluoromethane is as low as −29.8° C., its critical temperature is 112° C., its critical pressure is 42.2 kg./cm.$^2$ and its saturated vapour pressure at 100° C. is as high as 34.1 kg./cm.$^2$. Therefore, the pressure on the resin in the extrusion apparatus must be maintained high, when an ethylenic resin is mixed and kneaded with dichlorodifluoromethane under heating and pressure. The mixture is fully gelled at a temperature of at least 90° C. and preferably above 100° C., the gel is extruded and is foamed by releasing the pressure, but if the pressure on resin is made too high, the thin films forming the cells of the foam are destroyed by the high vapour pressure of dichlorodifluoromethane, cracks are formed on the surface of the foam and the cells tend to become continuous at the time of foaming of the resin by a sudden release of pressure, and thus it is not easy to obtain a foam with good resiliency, and further the degree of effectiveness of the dichlorodifluoromethane in foaming of the resin becomes low since dissipation of the gas is high. Therefore, it is impossible to obtain a foam which has a uniform cellular structure and smooth surfaces and one which has been foamed to a high ratio.

The other defect is that since the gas permeability of dichlorodifluoromethane through the membranes constituting the cells of ethylenic resin foams is higher than the corresponding permeability of air, the ratio of permeation of air into the cells of the foam is slower than that of permeation of dichlorodifluoromethane within the cells into the atmosphere. Therefore, the pressure within the cells of the foam are gradually reduced with the passage of time, the cells are collapsed by the atmospheric pressure and the foam is remarkably contracted.

This remarkable contraction of the foam is gradually recovered as air replaces dichlorodifluoromethane, permeating the cells, but it is not restored substantially to the size of the foam immediately after preparation, and uneven wrinkles and hollows are formed on the surfaces of the foam, and the appearance of the foam is greatly impaired. The above contraction tends to become more remarkable as the cross-sectional area of the foam becomes larger.

It is described in the specification of U.S. Pat. No. 2,948,665 that the contraction of the foam and the destruction of the cells can be prevented by applying ionizing radiation to the flowable gel immediately before extrusion, but this method necessitates a complicated apparatus and its operation is technically very difficult.

Accordingly, an object of the present invention is to provide a process for the preparation of a highly resilient ethylenic resin foam which has been foamed to a high ratio and has a uniform cellular structure.

A further object of the present invention is to provide a process for the preparation of a foam having a smooth surface wherein no cracks are formed on the surface of the foam during extrusion foaming.

Another object of the present invention is to provide a process for the preparation of a foam having a smooth surface wherein neither wrinkles nor hollows are formed on the surface because of the contraction of the foam with the passage of time.

Still another object of the present invention is to prepare a satisfactory foam using a simple apparatus. Other objects and the advantages of the present invention will be made clear by the following explanation.

The above objects of the present invention can be accomplished by using a mixture comprising dichlorodifluoromethane and at least one volatile organic compound selected from the group consisting of aliphatic hydrocarbons having a boiling point of about 0–70° C. and chlorofluorocarbons having a boiling point of about 0–70° C., having a saturated vapour pressure of less than 25 kg./cm.$^2$ at 100° C.; a mixture comprising dichlorodifluoromethane and at least one compound selected from monochloropentafluoroethane and octofluorocyclobutane; or a mixture comprising dichlorofluoromethane, at least one compound selected from monochloropentafluoroethane and octofluorocyclobutane, and at least one volatile organic compound selected from the group consisting of aliphatic hydrocarbons having a boiling point of about 0–70° C. and chlorofluorohydrocarbons having a boiling point of about 0–70° C., as the volatile organic foaming agent in extrusion foaming of ethylenic resins.

The ethylenic resins used in the present invention include ethylene homopolymers such as low density polyethylene, medium density polyethylene and high density polyethylene, and ethylene copolymers such as ethylene-vinyl acetate copolymer, ethylene-propylene copolymer, ethylene-1-butene copolymer, ethylene-butadiene copolymer, ethylene-vinyl chloride copolymer, ethylene-methyl methacrylate copolymer and ethylene-acrylonitrile copolymer. As the ethylenic resin, it is preferable to use an ethylene homopolymer or copolymer having an ethylene content above 50% by weight, preferably above 75% by weight.

A first feature of the present invention is that in a process for the preparation of an ethylenic resin foam by mixing and kneading the ethylenic resin with a volatile organic foaming agent under heating and pressure to form a flowable gel and releasing the pressure by extruding out the gel, a mixture comprising dichlorodifluoromethane (boiling point: −29.8° C., saturated vapour pressure at 100° C.: 34.1 kg./cm.$^2$) and at least one volatile organic compound selected from the group consisting of aliphatic hydrocarbons having a boiling point of about 0–70° C. and chlorofluorohydrocarbons having a boiling point of about 0–70° C., and having a saturated vapour pressure of less than 25 kg./cm.$^2$ at 100° C. is used as the volatile organic foaming agent. As the aliphatic hydrocarbons having a boiling point of about 0–70° C., for example, n-butane (boiling point: −0.5° C., saturated vapour pressure at 100° C.: 16.8 kg./cm.$^2$), pentane (boiling point: 36.1° C., saturated vapour pressure at 100° C.: 5.8 kg./cm.$^2$), petroleum ether (boiling point range: 40–70° C.), etc. can be mentioned, and as the chlorofluorohydrocarbons having a boiling point of about 0–70° C., for example, trichloromonofluoromethane (boiling point: 23.8° C., saturated vapour pressure at 100° C.: 8.4 kg./cm.$^2$), trichlorotrifluoroethane (boiling point: 47.6° C., saturated vapour pressure at 100° C.: 4.5 kg./cm.$^2$), dichloromonofluoromethane (boiling point: 8.9° C., saturated vapour pressure at 100° C.: 14.0 kg./cm.$^2$), etc. can be mentioned. These volatile organic compounds have considerably lower saturated vapour pressures than that of dichlorodifluoromethane, and can easily lower the saturated vapour pressure at 100° C. of the resultant mixture below 25 kg./cm.$^2$ without impairing the desirable property of dichlorodifluoromethane as the foaming agent, and therefore, they are suitable for use in the present invention.

Each of said volatile organic compounds has a gas permeability through the thin films constituting the cells of the foam higher than the corresponding gas permeability of dichlorodifluoromethane, and therefore if it is incorporated in too great an amount, it adversely affects the contraction of the foam. Accordingly, in the present invention it is preferable to mix 30–100 parts by weight of the volatile organic compounds per 100 parts by weight of dichlorodifluoromethane.

As described above, the first feature of the present invention resides in the use of the above-described specific mixture as the volatile organic foaming agent, and since the saturated vapour pressure at 100° C. of the mixture is made less than 25 kg./cm.$^2$ as compared with the case where dichlorodifluoromethane alone is used as foaming agent, and this mixture has an affinity to ethylenic resins which is considerably high but is such that its separation from the ethylenic resin can take place slowly, a comparatively slow expansion of the flowable gel of the resin takes place when it is extruded out and the pressure is released, and as a result the destruction of the thin films constituting the cells can be prevented, the dissipation of the foaming agent is made smaller, and a highly resilient foam which has a uniform cellular structure and which has been foamed to a high ratio and has a good surface condition can be obtained.

Further, as compared with the case where dichlorodifluoromethane alone is used as foaming agent, the mixture has an affinity to ethylenic resins so great that its separation from the ethylenic resin can take place slowly. Therefore, the ethylenic resin can be homogeneously mixed with the mixture, the foaming agent is difficult to separate from the resin and is extruded in a stabilized condition when the flowable gel is extruded, and a uniform foam can be obtained.

A second feature of the present invention resides in using a mixture comprising dichlorodifluoromethane and at least one compound selected from monochloropentafluoroethane (boiling point: −38.7° C., saturated vapour pressure at 100° C.: 47.0 kg./cm.$^2$) and octofluorocyclobutane (boiling point −5.8° C., saturated vapour pressure at 100° C.: 21.2 kg./cm.$^2$) as the volatile organic foaming agent. Further, a better result can be obtained, if the mixed foaming agent is incorporated in dichlorodifluoromethane in an amount of 5–30 parts by weight per 100 parts by weight of dichlorodifluoromethane.

As described above, the second feature of the present invention is that in a process for the preparation of an ethylenic resin foam by mixing and kneading an ethylenic resin with a volatile organic foaming agent under heating and pressure to form a flowable gel and releasing the pressure by extruding out the gel, a mixture comprising dichlorodifluoromethane and at least one compound selected from monochloropentafluoroethane and octofluorocyclobutane is used as the volatile organic foaming agent, and this mixed foaming agent has a far smaller gas permeability through the thin films constituting the cells of the foam as compared with the case where dichlorodifluoromethane alone is used as foaming agent, and, therefore, its replacement by air can be carried out satisfactorily without causing a remarkable contraction of the obtained foam. Accordingly, neither wrinkles nor hollows are formed on the surface of the foam, and a foam which has been foamed to a high ratio, is superior in dimensional stability and has a good surface condition can be obtained.

A third feature of the present invention resides in using a mixed foaming agent obtained by adding at least one volatile organic compound selected from the group consisting of aliphatic hydrocarbons having a boiling point of about 0–70° C. and chlorofluorohydrocarbons having a boiling point of about 0–70° C. as mentioned in the first feature of the present invention to the mixture described in the second feature of the present invention. It is preferable that the volatile organic compound should be mixed in an amount of less than 50 parts by weight per 100 parts by weight of the total mixed foaming agent.

As described in the first feature of the present invention, the volatile organic compounds have a low saturated vapour pressure, and if a mixed foaming agent obtained by adding such volatile organic compounds to the mixture described in the second feature of the present invention is used, the following advantages are obtained in addition to the advantages described in the second feature of the present invention.

Namely, since the mixed foaming agent has a lowered saturated vapour pressure and has a comparatively high affinity to ethylenic resins, the mixed foaming agent is mixed homogeneously with the ethylenic resin, and a comparatively slow expansion of the flowable gel takes place when it is extruded and the pressure is released, and as a result, the destruction of the thin films constituting the cells is prevented, the dissipation of the foaming agent is lowered and a foam which has a uniform cellular structure and has been foamed to a high ratio can be obtained.

Further, in the present invention, a rubbery material such as natural rubber, butadiene rubber, isobutylene rubber, acrylonitrile rubber, acrylonitrile-butadiene copolymer rubber or styrene-butadiene copolymer rubber may be mixed with the ethylenic resin. It is preferable that such a rubbery material should be mixed in an amount of 1–30 parts by weight, preferably 3–20 parts by weight, on the basis of the ethylenic resin.

If such a rubbery material is added, it becomes very easy to make the viscosity of the resin suitable for expansion when the flowable gel is extruded and expanded by releasing the pressure, and the strength of the cells is improved and a foam foamed to a high ratio can be obtained easily, and further the resilience, flexibility and the mechanical strength of the obtained foam can be improved.

Further, in the present invention, a powdery inorganic substance such as talc, clay, mica, silica, titanium oxide, zinc oxide or calcium silicate, a metallic salt of a fatty acid such as barium stearate, zinc stearate or aluminum stearate, or a combination of an organic acid such as tartaric acid, citric acid, oxalic acid or oleic acid and sodium carbonate or sodium bicarbonate may be added as foam controlling agents to control the size of the cells of the foam.

Further, in the present invention, the ethylenic resin and the mixed foaming agent are mixed and kneaded under heating and pressure by means of an extruding apparatus such as a screw type extruder to form a flowable gel and this gel is extruded into a lower pressure zone such as a zone under atmospheric pressure and is expanded by releasing the pressure, and the temperature in kneading and extrusion under heating and pressure can be adjusted at a temperature below or above the melting point of the ethylenic resin where a satisfactory flowable gel can be formed.

Further, in the present invention, it is preferable that the ethylenic resin and the mixed foaming agent should be mixed and kneaded in the vapour phase and the mixed foaming agent should be turned into liquid phase immediately before the extrusion. The mixed foaming agent has a larger specific volume in the vapour phase than in the liquid phase, and, therefore, mixed foaming agent in the vapour phase is well dispersed in kneading and the ethylenic resin and the mixed foaming agent are mixed homogeneously, and the mixed foaming agent in the liquid phase is vapourized readily in extrusion, and it takes the latent heat of vapourization from the resin as it is vapourized, the expanded resin is cooled satisfactory, the contraction of the foam and the destruction of the cells can be prevented better and a satisfactory foam can be obtained.

In the present invention, the foam in any desirable shape can be obtained by extrusion, e.g. sheet, film, pipe or rod.

The following examples are given by way of illustration of the features of the invention, but should not be construed as limiting its scope.

EXAMPLE 1

The extrusion apparatus used in this example comprises a screw type extruder wherein a screw with 40 mm. in diameter, 960 mm. in length and 40 mm. in unit pitch is provided in a cylinder and an injection opening for the foaming agent is provided in the middle of the cylinder, and a circular die with 80 mm. in slit diameter and 0.3 mm. in clearance provided at the tip end of the extruder.

A granular polyethylene having a density of 0.92 g./cc. and a melt index of 4.0 and fine powdery calcium carbonate in an amount of 0.8 part by weight per 100 parts by weight of polyethylene were uniformly mixed, the mixture was fed into the entrance opening for raw material of the extruder, and then the resin was kneaded and extruded up to the position of the injection opening for the foaming agent while maintaining the temperature of the cylinder up to the injection opening for foaming agent at 140° C.

Then, a mixed foaming agent having a composition as shown in the following Table 1 was injected into the injection opening for the foaming agent at a ratio of 15 parts by weight per 100 parts by weight of the resin, the resin was extruded from the slit of the circular die into the atmosphere while maintaining the temperature of the cylinder up to 240 mm. after the injection opening for foaming agent at 120° C., the temperature of the cylinder thereafter at 100° C. and the temperature of the circular die at 100° C., and then the resin was passed over a circular plate provided on the circular die to readjust its size in the radial directions and produce a tubular foam.

The densities and the surface conditions of the tubular foams thus obtained are shown in Table 1.

For comparison, a tubular foam was produced under the same conditions as in the above Example 1 except that dichlorodifluoromethane alone was used as foaming agent. The density and the surface condition of this tubular foam are also shown in Table 1.

Further, in Example 1, a, b and c and comparative Example 1, the pressures in the cylinder at the inlet for the foaming agent were 65, 65, 70 and 80 kg./cm.$^2$, respectively, and the pressure in the circular die at the inlet for the resin were 105, 105, 110 and 120 kg./cm.$^2$, respectively. In each case, the pressure for injection of the foaming agent was 5–10 kg./cm.$^2$ higher than the pressure in the cylinder at the inlet for the foaming agent.

TABLE 1

| | Composition of foaming agent (parts by weight) | | | | Saturated vapour pressure at 100° C. (kg./cm.$^2$) | Density of foam (g./cc.) | Condition of cells of foam | Condition of surface of foam |
|---|---|---|---|---|---|---|---|---|
| | Dichloro-difluoro-methane | Trichloro-monofluoro-methane | Trichloro-trifluoro-ethane | n-Butane | | | | |
| Example 1: | | | | | | | | |
| a | 60 | 40 | | | 23.8 | 0.048 | Good | Good. |
| b | 60 | | 40 | | 22.2 | 0.044 | ----do---- | Do. |
| c | 50 | | | 50 | 23.7 | 0.042 | ----do---- | Do. |
| Comparative Example 1 | 100 | | | | 34.1 | 0.055 | Cells were destroyed | Cracks were formed. |

As may be clear from the above results of Example 1, when mixed foaming agents comprising dichlorodifluoromethane and at least one volatile organic compound selected from the group consisting of aliphatic hydrocarbons having a boiling point of about 0–70° C. and chlorofluorohydrocarbons having a boiling point of about 0–70° C., and having a saturated vapour pressure of less than 25 kg./cm.$^2$ at 100° C. are used as the foaming agents in the present invention, the destruction of the cells of the foam or the cracks on the surface of the foam do not occur, and highly elastic foams which have a uniform cellular structure and a smooth surface and have been foamed to a high ratio can be obtained.

On the other hand, in the foam obtained in comparative Example 1, the cells of the foam were destroyed and opened owing to the high vapour pressure of the foaming agent, cracks were formed on the surface, the expansion ratio and the resiliency were low, and the surface condition was poor.

EXAMPLE 2

The extrusion apparatus used in this example comprises a screw type extruder wherein a screw with 65 mm. in diameter, 2080 mm. in length and 65 mm. in unit pitch is provided in a cylinder and an injection opening for foaming agent is provided in the middle of the cylinder, and a metallic die having a nozzle of 8 mm. in diameter provided at the tip end of the extruder.

A granular polyethylene having a density of 0.92 g./cc. and a melt index of 2.0 and fine powdery talc in an amount of 0.8 part by weight per 100 parts by weight of said polyethylene were uniformly mixed, the mixture was fed into the entrance opening for raw material of the extruder, and then the resin was kneaded and extruded up to the position of the injection opening for foaming agent while maintaining the temperature of the cylinder up to the injection opening for foaming agent at 140° C.

Then, a mixed foaming agent having a composition as shown in the following Table 2 was injected into the injection opening for the foaming agent at a ratio of 15 parts by weight per 100 parts by weight of the resin, the resin was extruded from the nozzle of thea metallic die into the atmosphere while maintaining the temperature of the cylinder up to 520 mm. after the injection opening for foaming agent at 120° C., the temperature of the cylinder thereafter at 100° C. and the temperature of the metallic die at 95° C., and thereby a foam was obtained.

For comparison, a foam was produced under the same conditions as the above Example 2 except that dichlorodifluoromethane alone was used as foaming agent.

Further, in Example 2, a, b and c and comparative Example 2, the pressures inside the cylinder at the inlet for the foaming agent were 55, 50, 50 and 55 kg./cm.$^2$, respectively, and the pressure inside the metallic die at the inlet for the resin were 58, 50, 52 and 60 kg./cm.$^2$, respectively. In each case, the pressure for injection of the foaming agent was 5–10 kg./cm.$^2$ higher than the pressure in the cylinder at the inlet for the foaming agent.

TABLE 2

| | Composition of foaming agent (parts by weight) | | | |
|---|---|---|---|---|
| | Dichlorodifluoro-methane | Octofluoro-cyclobutane | Trichloro-monofluoro-methane | n-Butane |
| Example 2: | | | | |
| a | 90 | 10 | | |
| b | 45 | 10 | 45 | |
| c | 45 | 10 | | 45 |
| Comparative Example 2 | 100 | | | |

The relation between the number of days passed after the formation of the foam and the specific volume of the foam was measured, and the results as shown in the following Table 3 were obtained.

TABLE 3

| | Specific volume (cc./g.) | | | | | | | |
|---|---|---|---|---|---|---|---|---|
| | Directly after production | After— | | | | | | |
| | | 2 days | 5 days | 10 days | 15 days | 20 days | 25 days | 30 days |
| Example 2: | | | | | | | | |
| a | 33 | 36 | 37 | 37 | 37 | 37 | 37 | 37 |
| b | 30 | 23 | 28 | 31 | 32 | 32 | 32 | 32 |
| c | 30 | 23 | 27 | 27 | 32 | 32 | 32 | 32 |
| Comparative Example 2 | 32 | 21 | 20 | 23 | 25 | 27 | 28 | 28 |

EXAMPLE 3

The extrusion apparatus used in this example comprises a screw type extruder wherein a screw with 50 mm. in diameter, 1500 mm. in length and 50 mm. in unit pitch is provided in a cylinder and an injection opening for the foaming agent is provided in the middle of the cylinder, and a metallic die having a nozzle of 3 mm. in diameter provided at the tip end of the extruder.

A granular polyethylene having a density of 0.92 g./cc. and a melt index of 2.0 and calcium carbonate in an amount of 2 parts by weight per 100 parts by weight of the polyethylene were uniformly mixed, the mixture was fed into the entrance for raw material of the extruder, and then the resin was kneaded and extruded up to the position of the injection opening for the foaming agent while maintaining the temperature of the cylinder up to the injection opening for foaming agent at 140° C.

Then, a mixed foaming agent having a composition as shown in the following Table 4 was injected into the injection opening for the foaming agent at a ratio of 15 parts by weight per 100 parts by weight of the resin, the resin was extruded from the nozzle of the metallic die into the atmosphere while maintaining the temperature of the cylinder up to 350 mm. after the injection opening for the foaming agent at 120° C., the temperature of the cylinder thereafter at 100° C. and the temperature of the metallic die at 95° C., and thereby a foam was obtained.

Further, in Example 3, a, b, c, d, e and f, the pressures in the cylinder at the inlet for the foaming agent were 62, 60, 60, 50, 58 and 58 kg./cm.$^2$, respectively, and the pressures in the metallic die at the inlet for the resin were 85, 80, 80, 80, 75 and 75 kg./cm.$^2$, respeatively. In each case, the pressure in injection of the foaming agent was 5–10 kg./cm.$^2$ higher than the pressure in the cylinder at the inlet for the foaming agent.

TABLE 4

| | Composition of foaming agent (parts by weight) | | | | |
|---|---|---|---|---|---|
| | Dichlorodi-fluoro-methane | Octofluoro-cyclobutane | Monochloro-pentafluoro-ethane | Trichloro-monofluoro-methane | n-Butane |
| Example 3: | | | | | |
| a | 80 | | 20 | | |
| b | 40 | | 20 | 40 | |
| c | 40 | | 20 | | 40 |
| d | 85 | 5 | 10 | | |
| e | 45 | 5 | 10 | 40 | |
| f | 45 | 5 | 10 | | 40 |

The relation between the number of days passed after the formation of the foam and the specific volume of the foam was measured, and the results as shown in the following Table 5 were obtained.

TABLE 5

| | Specific volume (cc./g.) | | | | | | | |
|---|---|---|---|---|---|---|---|---|
| | Directly after operation | After— | | | | | | |
| | | 2 days | 5 days | 10 days | 15 days | 20 days | 25 days | 30 days |
| Example 3: | | | | | | | | |
| a | 28 | 28 | 30 | 30 | 30 | 30 | 30 | 30 |
| b | 27 | 20 | 26 | 28 | 28 | 28 | 28 | 28 |
| c | 27 | 20 | 25 | 28 | 28 | 28 | 28 | 28 |
| d | 30 | 32 | 33 | 33 | 33 | 33 | 33 | 33 |
| e | 28 | 22 | 27 | 30 | 30 | 30 | 30 | 30 |
| f | 28 | 21 | 26 | 29 | 29 | 29 | 29 | 29 |

As may be clear from the above results of Examples 2 and 3, when mixed foaming agents comprising dichlorodifluoromethane and at least one compound selected from monochloropentafluoroethane and octofluorocyclobutane were used as the foaming agents, the contraction of the foams was prevented and foams having a high expansion ratio, a high dimensional stability and a good surface condition were obtained.

Especially in the foams obtained in Example 2, a and Example 3, a and d, entirely no contraction of the foams was recognized, entirely no wrinkles or hollows were formed on the surface, the surface condition was good and the specific volume increased from the specific volume measured directly after production with the passage of time and reached an equilibrium. This increase in specific volume was caused because the weight of the foam was decreased as the foaming agent contained inside the cells of the foam escaped through the thin films constituting the cells, while the volume of the foam remained almost constant.

In the foams obtained in Example 2, b and c and Example 3, b, c, e and f, a slight contraction of the foam was recognized at first, but the specific volume was restored to the specific volume measured directly after production of the foam or was increased even larger than that in about 10 days, and with the restoration of the specific volume the wrinkles and hollows on the surface of the foam were eliminated and the surface condition was improved, and the foams thus obtained were satisfactory for practical use.

On the other hand, in the foam obtained in comparative Example 2, a remarkable contraction of the foam was recognized in a few days after production of the foam, its recovery from the contraction thereafter was so slow that about 30 days were taken in reaching an equilibrium, and the foam was not restored to the specific volume measured directly after production even when the equilibrium was reached, and the wrinkles and hollows on the hollows on the surface of the foam remained.

We claim:

1. In a process for producing an ethylenic resin foam comprising mixing and kneading an ethylenic resin selected from the group consisting of ethylene homopolymers and copolymers of at least 50% by weight ethylene and a monomer copolymerizable with ethylene, with a volatile organic foaming agent under conditions of heating and pressure to form a flowable gel and thereafter releasing the pressure by extruding out said gel, the improvement wherein said foaming agent consisting essentially of a mixture of (A) dichlorodifluoromethane and (B) at least one chlorofluorohydrocarbon having a boiling point of about 0–70° C., said foaming agent having a saturated vapor pressure of less than 25 kg./cm.$^2$ at 100° C.

2. The process of claim 1 wherein said ethylenic resin is selected from the group consisting of low density polyethylene, medium density polyethylene, high density polyethylene, ethylene-vinyl acetate copolymer, ethylene-propylene copolymer, ethylene-butene-1 copolymer, ethylene-butadiene copolymer, ethylene-vinyl chloride copolymer, ethylene-methyl methacrylate copolymer, ethylene-acrylonitrile copolymer and blends thereof.

3. The process of claim 2 wherein said resin further contains a rubbery material selected from the group consisting of natural rubber, butadiene rubber, isobutylene rubber, acrylonitrile rubber, acrylonitrile-butadiene copolymer rubber and styrene butadiene copolymer rubber.

4. The process of claim 1, wherein compound (B) is mixed in an amount of 30–100 parts by weight per 100 parts by weight of said dichlorodifluoromethane.

5. The process of claim 1, wherein compound (B) is a compound selected from the group consisting of, trichloromonofluoromethane, trichlorotrifluoroethane and dichloromonofluoromethane.

References Cited
UNITED STATES PATENTS

| | | | |
|---|---|---|---|
| 2,948,664 | 8/1960 | Rubens et al. | 260—2.5 E |
| 3,121,911 | 2/1964 | Lightner | 260—2.5 E |

SAMUEL H. BLECH, Primary Examiner

W. J. BRIGGS, Sr., Assistant Examiner

U.S. Cl. X.R.

260—2.5 HA, 4 R, 33.6 PQ, 33.8 UA, 85.3 R, 87.3, 86.7, 87.5 C